(12) United States Patent
Keilich

(10) Patent No.: US 12,184,124 B2
(45) Date of Patent: Dec. 31, 2024

(54) COMBINATION OF VACUUM AND POSITIVE PRESSURE IN MOTOR STATOR POTTING PROCESS

(71) Applicant: Hamilton Sundstrand Corporation, Charlotte, NC (US)

(72) Inventor: Peter W. Keilich, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 255 days.

(21) Appl. No.: 17/740,499

(22) Filed: May 10, 2022

(65) Prior Publication Data

US 2023/0369923 A1    Nov. 16, 2023

(51) Int. Cl.
*H02K 15/10*    (2006.01)
*H02K 1/20*    (2006.01)

(52) U.S. Cl.
CPC .............. *H02K 1/20* (2013.01); *H02K 15/10* (2013.01)

(58) Field of Classification Search
CPC .......... H02K 1/20; H02K 9/197; H02K 15/12; H02K 15/10
USPC ............ 310/43, 45, 64; 264/272.2; 427/104; 118/50
See application file for complete search history.

(56) References Cited

U.S. PATENT DOCUMENTS

| | | |
|---|---|---|
| 4,950,438 A | 8/1990 | Nakamura et al. |
| 7,684,146 B1 | 3/2010 | Andrikowich et al. |
| 8,508,083 B2 | 8/2013 | Sheeran et al. |
| 8,614,538 B2 | 12/2013 | Bradfield |
| 2003/0062189 A1* | 4/2003 | Hudson ................. H02K 15/10 174/120 R |
| 2005/0074548 A1* | 4/2005 | Puterbaugh ............ H02K 15/12 427/104 |
| 2011/0304228 A1* | 12/2011 | Bradfield ............... H02K 5/203 29/596 |

(Continued)

FOREIGN PATENT DOCUMENTS

CN    108219465 A  *  6/2018
CN    112391139 A     2/2021

(Continued)

OTHER PUBLICATIONS

CN108219465A English translation (Year: 2024).*
European Search Report for Application No. 23172352.9, mailed Oct. 20, 2023, 7 pages.

*Primary Examiner* — Terrance L Kenerly
*Assistant Examiner* — Viswanathan Subramanian
(74) *Attorney, Agent, or Firm* — CANTOR COLBURN LLP

(57) ABSTRACT

A method of manufacturing an electric motor assembly includes inserting the pump motor stator into a vacuum chamber. The pump motor stator comprises a housing having a cavity formed therein and a pump motor stator located within the cavity. The pump motor stator contains an integral cooling tube located radially inward of the stator. The method also includes applying a vacuum to the pump motor stator in the vacuum chamber and flowing a potting material into a gap between the stator and the cooling tube and the stator, the gap extending a first distance longitudinally between the stator and the cooling tube. Pressure is applied to the potting material to push the potting material further into the gap.

15 Claims, 4 Drawing Sheets

(56) References Cited

U.S. PATENT DOCUMENTS

2012/0107490 A1* 5/2012 Abramov .............. H01F 41/005
  427/104
2015/0145351 A1   5/2015 Porcher et al.
2021/0075284 A1   3/2021 Brookes

FOREIGN PATENT DOCUMENTS

| EP | 2523314 A2 | 11/2012 |
|----|------------|---------|
| WO | 2005041390 A1 | 5/2005 |
| WO | 2005053136 A1 | 6/2005 |
| WO | 2022090829 A1 | 5/2022 |

* cited by examiner

COMBINATION OF VACUUM AND POSITIVE PRESSURE IN MOTOR STATOR POTTING PROCESS

BACKGROUND

The embodiments herein generally relate to electrical motors and more specifically, to motor stator potting.

An electric motor generally includes a stationary stator assembly and a rotating rotor assembly. Some electric motors contain a cooling tube radially inward of a stator of the electric motor. The cooling tube is used to provide cooling to the stator, however the cooling tube must be thermally connected to the stator while being electrically insulated from the stator to prevent short circuits.

BRIEF DESCRIPTION

In one exemplary embodiment, a method of manufacturing an electric motor assembly includes inserting the pump motor stator into a vacuum chamber. The pump motor stator comprises a housing having a cavity formed therein and a pump motor stator located within the cavity. The pump motor stator contains an integral cooling tube located radially inward of the stator. The method also includes applying a vacuum to the pump motor stator in the vacuum chamber and flowing a potting material into a gap between the stator and the cooling tube, the gap extending a first distance longitudinally between the stator and the cooling tube. Pressure is applied to the potting material to push the potting material further into the gap.

In addition to one or more of the features described herein, prior to applying the pressure to the potting material to push the potting material further into the gap the potting material is allowed to flow a first selected distance longitudinally into the gap, the first selected distance being less than the first distance.

In addition to one or more of the features described herein, applying the pressure to the potting material to push the potting material further into the gap further comprises inserting the housing into a pressure vessel, and applying air pressure to the potting material to push the potting material further into the gap.

In addition to one or more of the features described herein, the method also includes ceasing application of the pressure when the potting material extends the first distance longitudinally between the stator and the cooling tube and curing the potting material.

In addition to one or more of the features described herein, the method also includes curing the potting material after applying the pressure to the potting material.

In addition to one or more of the features described herein, prior to placing the pump motor stator into the vacuum chamber, the method further comprises installing the pump motor stator into the cavity.

In addition to one or more of the features described herein, prior to placing the pump motor stator into the vacuum chamber, the method further comprises inserting the stator assembly into the housing set containing the integral cooling tube radially inward of the stator.

In addition to one or more of the features described herein, prior to placing the pump motor stator into the vacuum chamber, the method further comprises heating the potting material to a selected temperature.

In addition to one or more of the features described herein, prior to placing the pump motor stator into the vacuum chamber, the method further comprises mixing the potting material while heating.

In addition to one or more of the features described herein, prior to placing the pump motor stator into the vacuum chamber, the method further comprises degassing the potting material while heating.

In addition to one or more of the features described herein, the method also includes heating the vacuum chamber while applying the vacuum to the pump motor stator in the vacuum chamber.

In addition to one or more of the features described herein, the potting material is an epoxy potting compound, i.e., Bacon P-82C™.

In addition to one or more of the features described herein, the method also includes removing the pump motor stator from the vacuum chamber to apply the pressure.

In another exemplary embodiment, a pump motor stator includes a housing having a cavity formed therein and a stator assembly located within the cavity. A cooling tube is located radially inward of the stator, the cooling tube and the stator are separated by a gap. A potting material is located in the gap, the potting material electrically insulates the cooling tube from the stator and thermally connect the cooling tube to the stator.

In addition to one or more of the features described herein, the potting material is an epoxy potting compound, i.e., Bacon P-82C™.

In addition to one or more of the features described herein, the potting material is inserted into the gap via a combination of vacuum suction and air pressure.

In addition to one or more of the features described herein, the gap is 0.002 inches at narrowest parts.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments detailed herein relate to motor stator potting. According to an exemplary embodiment, the potting material is an epoxy potting compound, i.e., Bacon P-82C™. As previously noted, some electric motors contain a cooling tube radially inward of the stator of the electric motor. The cooling tube is used to provide cooling to the stator, however the cooling tube must be thermally connected to the stator while being electrically insulated from the stator to prevent short circuits. The space between the central cooling tube and the stator assembly may be extremely small, such as, for example, around 0.0508 millimeters (mm) (0.002 inches) at the narrowest parts. While the smaller the gap, the greater the cooling efficiency, the narrow gap makes it extremely difficult to fill the space with the potting material that serves as a thermal transfer media. The potting material must fit into this small space to ensure proper cooling between the central cooling tube and the stator, providing thermal contact therebetween. This is especially necessary in a space application (i.e., vacuum) in which convective heat transfer from the stator assembly to the cooling tube is not possible.

One or more embodiments detailed herein involve pulling the potting material into the space in a vacuum chamber and also pushing the material and distributing it within the space in a pressure vessel. The potting of the stator assembly according to one or more embodiments makes the potting material resistant to cracking while simultaneously being electrically insulating and thermally connecting. Any cracking in the potting material could sever magnet wires on the stator assembly.

Figure 1:
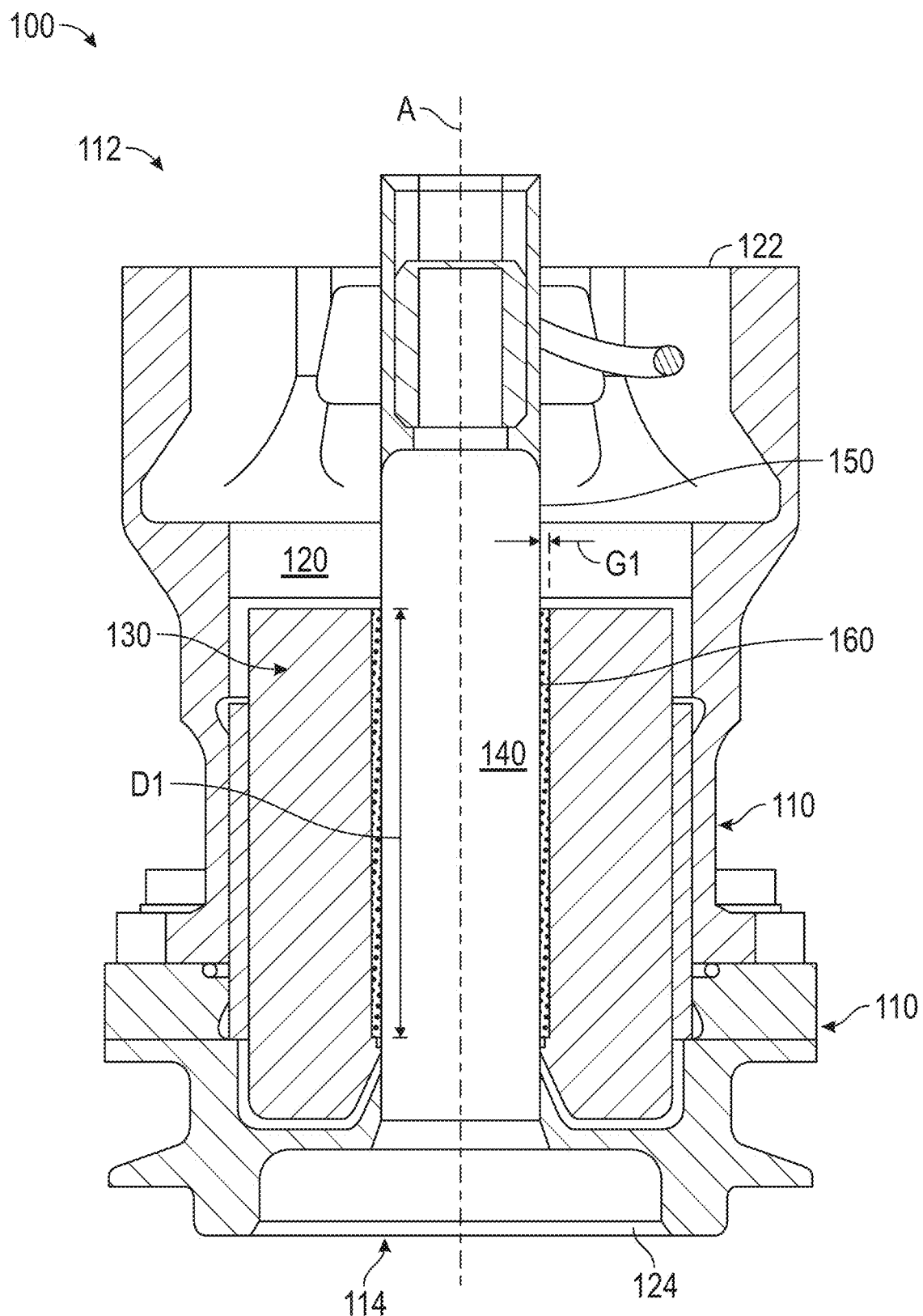
FIG. 1 is a cross-sectional view of a potted stator according to one or more embodiments.

Referring to FIG. 1, a cross-sectional view of a potted stator assembly 100 is illustrated in accordance with one or more embodiments. The potted stator assembly 100 may be part of a permanent magnet motor, an induction motor, a switched reluctance motor, a wound field motor, a hybrid motor, or any other type of motor known to one of skill in the art. The potted stator assembly 100 includes a housing 110 and a cavity 120 defined therein. The housing 110 is shown as being made up of two (upper and lower) parts in the exemplary illustration. The cavity 120 may extend from a first opening 122 located at a first end 112 of the potted stator assembly 100 to a second opening 124 located at the second end 114, opposite the first end 112.

Figure 2:
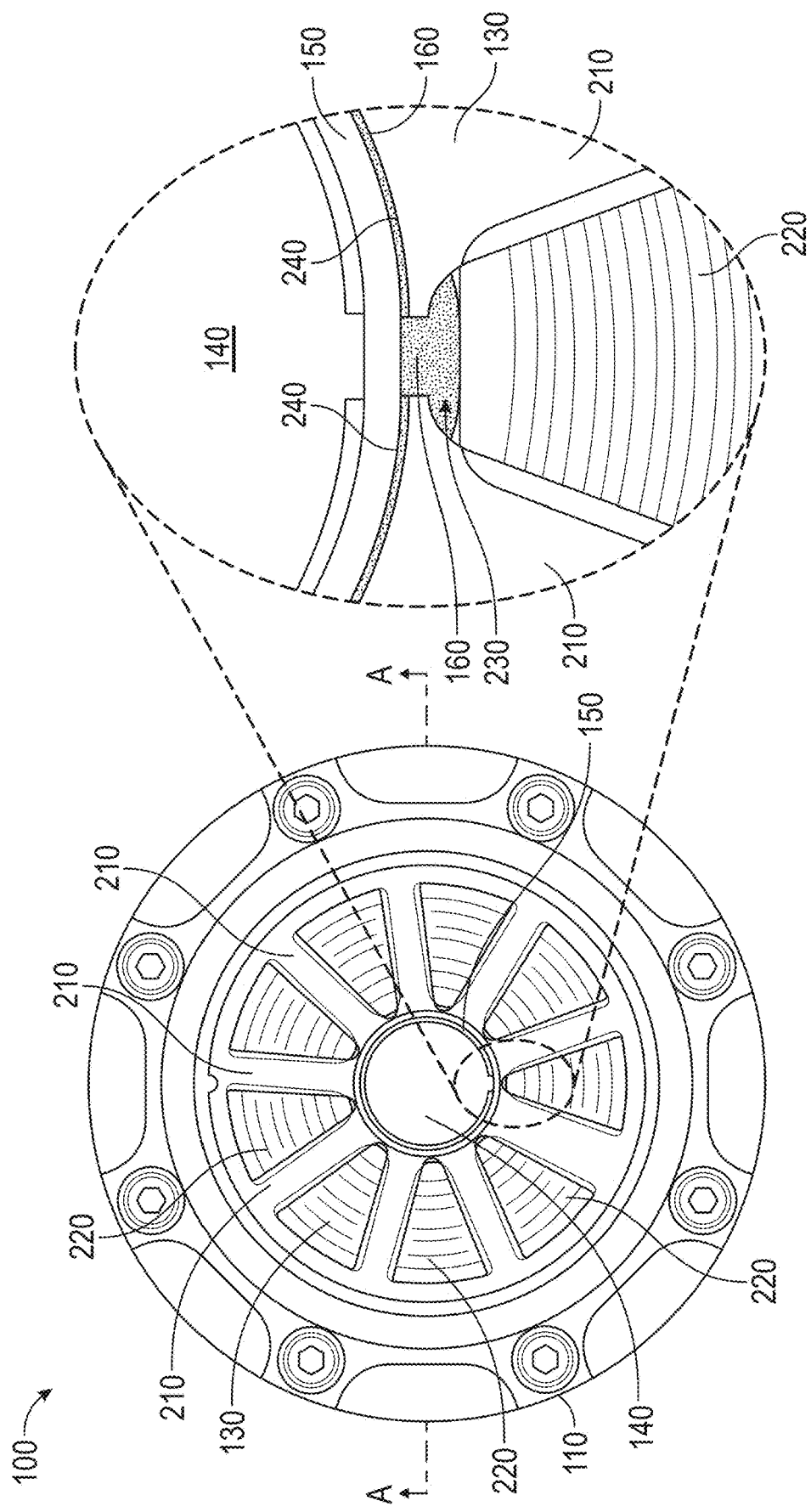
FIG. 2 details the gap that is filled with the potting material to obtain the potted stator according to one or more embodiments.

The potted stator assembly 100 includes a cooling tube 150 that is integral to the housing 110 and a stator 130 that is radially outward from the cooling tube 150 relative to the longitudinal axis A. The stator 130 may include laminated cores 210 (FIG. 2) wound with copper wires 220 (FIG. 2). As illustrated in FIG. 1, the stator 130 may be part of a permanent magnet motor that also includes a rotor (not shown).

As shown, the cooling tube 150 is located radially inward of the stator 130 relative to the axis A. The cooling tube 150 has a hollow cooling passage 140 formed therein. During operation of the electric motor, ammonia may flow through the cooling passage 140 to remove heat from the stator 130. That is, thermal contact between the cooling tube 150 (cooled by ammonia flow) and the stator 130 facilitates heat transfer from the stator 130 to the cooling tube 150. As previously noted, the thermal contact via a potting material 160 between the cooling tube 150 and the stator 130 is especially needed in a space application in which convective heat transfer is not possible. The cooling tube 150 may be separated from the stator 130 by a gap G1. As FIG. 2 indicates, the gap G1 may not be uniform at all points around the circumference of the cooling tube 150. At the narrowest points (i.e., in narrower-gap areas 240 (FIG. 2)), the gap G1 may be about 0.0508 mm (0.002 in). The gap G1 may extend a distance D1 longitudinally, as shown.

The potted stator assembly 100 is shown with the potting material 160 in the gap G1 between the cooling tube 150 and the stator 130. As discussed with reference to FIG. 3, filling the gap G1 completely with the potting material 160 is accomplished via a combination of vacuum suction and air pressure, as discussed with reference to FIG. 3. When the potting material 160 fills the gap G1, it contacts both the outer surface of the cooling tube 150 and the stator 130, thereby thermally connecting the cooling tube 150 and the stator 130. The potting material 160 is also configured to electrically insulate the cooling tube 150 from the stator 130. The cooling tube 150 may be composed of a metallic material for purposes of heat transfer and structural support, thereby necessitating this electrical insulation. According to an exemplary embodiment, the potting material 160 is an epoxy potting compound (e.g., Bacon P-82C™).

FIG. 2 shows a cross-sectional view of the potted stator assembly 100 looking down at the first end 112. The cores 210 wound with copper wires 220 are indicated as being radially outward from the cooling tube 150, which includes a hollow cooling passage 140 within. The expanded view of a portion of the potted stator assembly 100 shown in FIG. 2 details the non-uniformity of the gap G1 that is filled with the potting material 160 to obtain the potted stator assembly 100 according to one or more embodiments. Specifically, wider-gap areas 230 are alternated with narrower-gap areas 240, as shown. With regard to obtaining a complete fill with the potting material 160, the narrower-gap areas 240 present a bigger challenge than the wider-gap areas 230. As previously noted, the narrower-gap areas 240 may be on the order of 0.002 inches. Prior approaches to potting involving only vacuum suction may prove ineffective based on the narrowness of the gap G1 and the potting material 160 that is used. According to one or more embodiments, vacuum suction is used in combination with pressure to obtain a complete fill of the gap G1 with the potting material 160.

Figure 3:
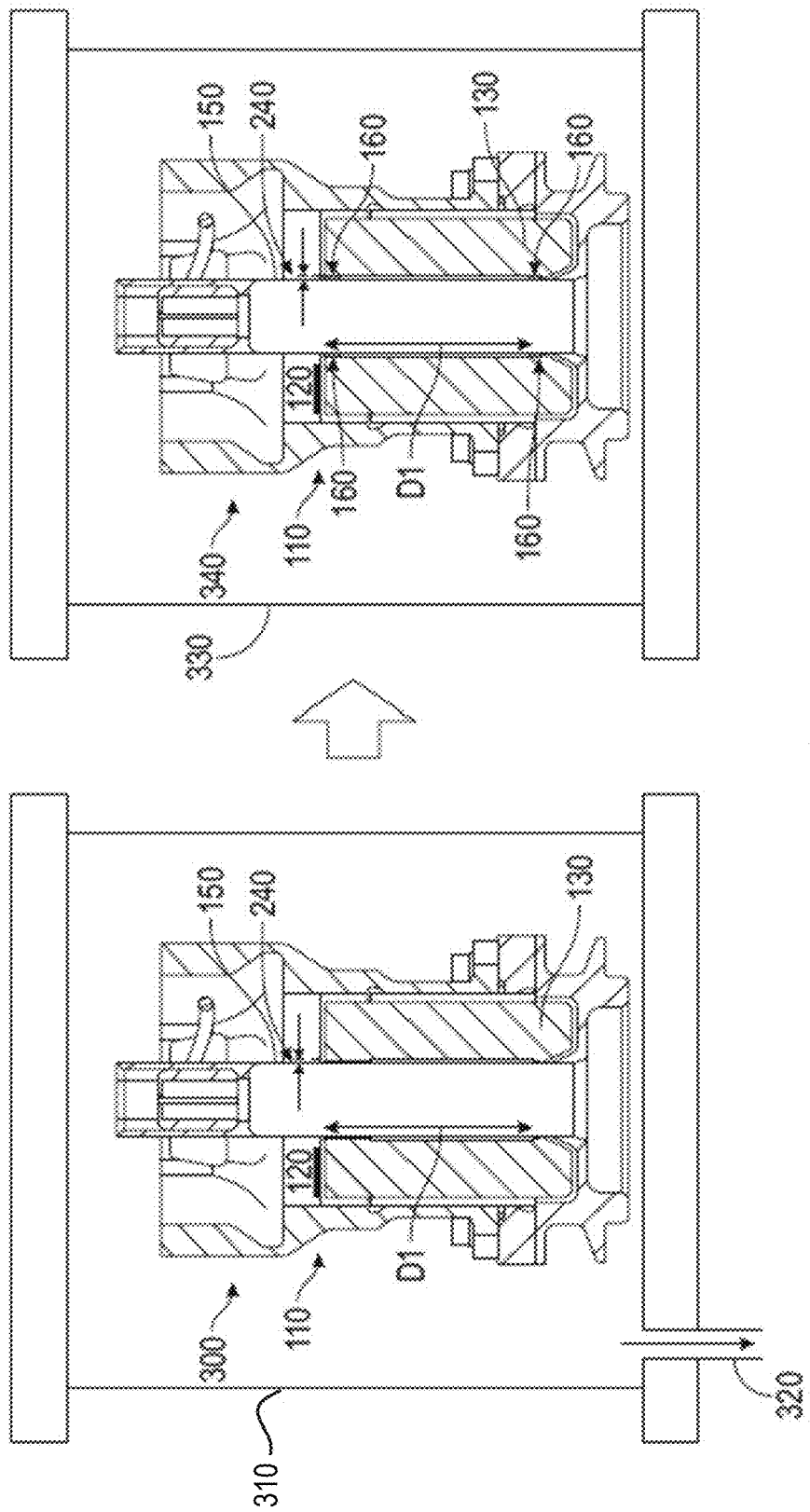
FIG. 3 illustrates aspects of the process flow used to obtain the potted stator assembly according to one or more embodiments.

FIG. 3 illustrates aspects of the process flow used to obtain the potted stator assembly 100 according to one or more embodiments. A stator assembly 300 is shown in a vacuum chamber 310. An intermediate stator assembly 340 is shown resulting from a vacuum pull of the potting material 160 into the gap G1. The cross-section shown in FIG. 3 is taken to expose the narrower-gap areas 240 on either side of the cooling tube 150. That is, the cross-section is taken along A-A, as indicated in FIG. 2.

The stator assembly 300 shown in the vacuum chamber 310 has no potting material 160 in the gap G (in the narrower-gap area 240 shown). The vacuum chamber 310 is shown with an outlet port 320 through which gasses (e.g., air) is removed, creating a pressure drop inside the vacuum chamber 310 as compared with ambient pressure. The pressure may be about—15 pounds per square inch (psi) inside the vacuum chamber 130, for example. The vacuum chamber 310 may be heated inside and outside (e.g., to about 160 degrees Fahrenheit) to encourage flow (i.e., reduce viscosity) of the potting material 160 that is drawn into the gap G1. The lower pressure inside the vacuum chamber 310 results in the potting material 160 being pulled into the gap G1. The potting material 160 may be pulled along the entire longitudinal distance D1 of the gap G1 in wider-gap areas 230. However, in the narrower-gap areas 240, as shown for the intermediate stator assembly 340, the potting material 160 only enters the gap G1 at the ends and edges. That is, the potting material 160 enters the narrower-gap areas 240 at the ends (i.e., top and bottom according to the orientation shown in FIGS. 3 and 4). In addition, the potting material 160 enters the narrower-gap areas 240 at the edges (i.e., at the borders with the wider-gap areas 230 on each side), but the entirety of the narrower-gap areas 240 are not filled with the potting material 160.

Following the vacuum pull of the potting material 160 in the vacuum chamber 310, the resulting intermediate stator assembly 340 is put in a pressure vessel 330 to obtain the potted stator assembly 100 shown in FIG. 1. The increased pressure in the pressure vessel 330 as compared with ambient pressure (e.g., 50 psi) results in the potting material 160 at the ends of the gap G1 in the intermediate stator assembly 340 being pushed further into the center, along the longitudinal distance D1, of the gap G1. The potting material 160 completely fills the narrower-gap areas 240. This pressure-based push of the potting material 160 may be followed by a curing period in an oven. As previously noted, the pressure-based push following the vacuum-based pull facilitates complete fill of even the narrower-gap areas 240 with the potting material 160.

Figure 4:
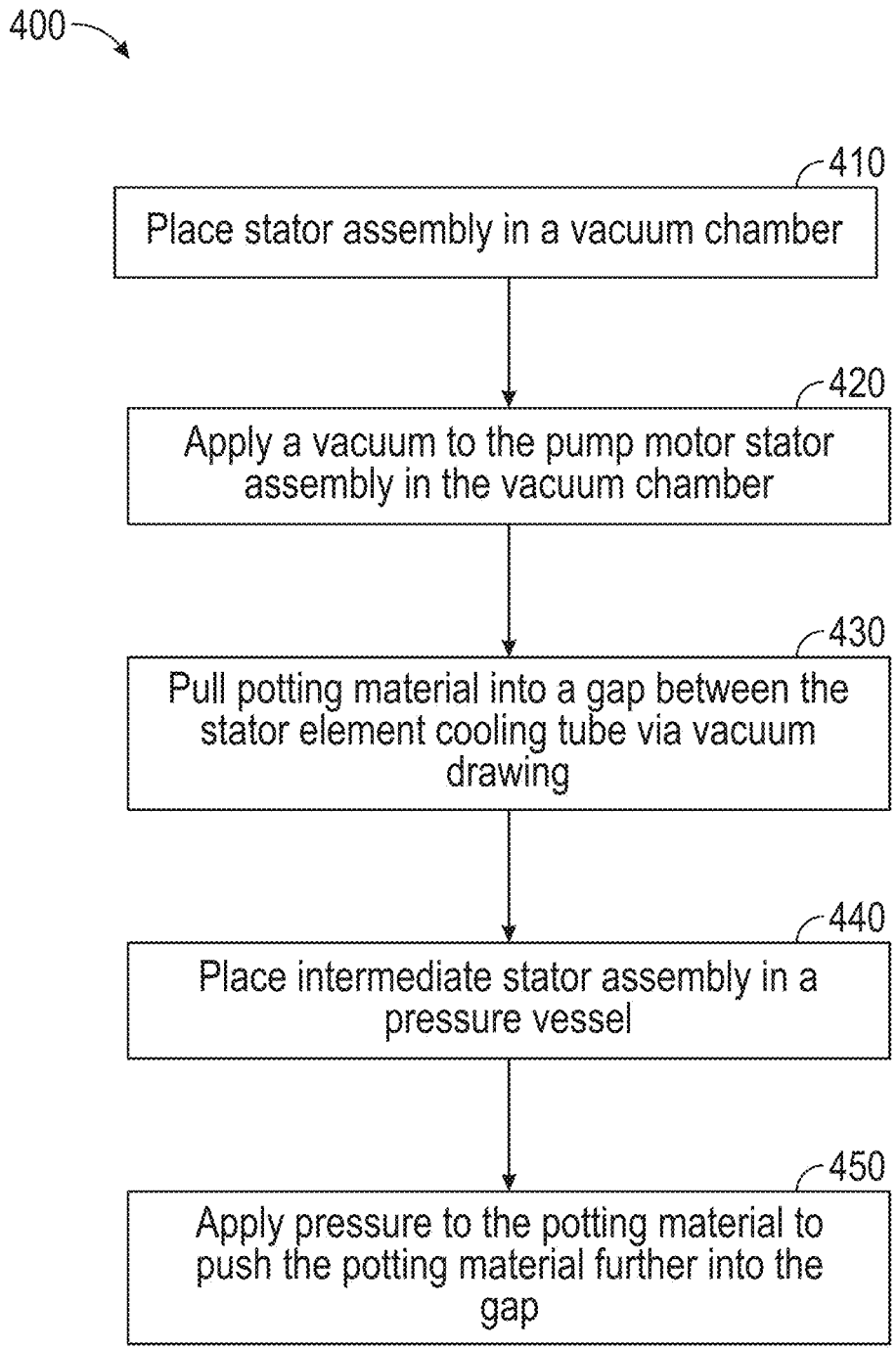
FIG. 4 is a process flow of a method of aspects of assembling a potted stator assembly according to one or more embodiments.

FIG. 4 is a process flow of a method 400 of aspects of assembling a potted stator assembly 100 according to one or more embodiments. At block 410, the processes include placing a stator assembly in a vacuum chamber 310. At block 420, the processes include applying a vacuum to the stator assembly 300 in the vacuum chamber 310. As previously noted, the vacuum chamber 310 may be heated while applying the vacuum to the stator assembly 300 to reduce viscosity of the potting material 160.

At block 430, the processes include pulling the potting material 160 into the gap G1 between the cooling tube 150 and the stator 130 of the stator assembly 300 via vacuum drawing. This results in the intermediate stator assembly 340. At block 440, the processes include placing the intermediate stator assembly 340 in a pressure vessel 330. At block 450, the placement in the pressure vessel results in applying pressure to the potting material 160 to push the potting material 160 further into the gap G1. The processes may also include curing the potted stator assembly 100 in an oven to make the potting material 160 that fills the gap G1 rigid.

While the above description has described the flow process of FIG. 4 in a particular order, it should be appreciated that unless otherwise specifically required in the attached claims that the ordering of the steps may be varied.

Technical effects and benefits of the features described herein include drawing a potting material into stator assembly in a gap between the stator and cooling tube under a vacuum and then pushing the potting material further into the gap using a pressure vessel.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a potted stator assembly, comprising: inserting a stator assembly into a vacuum chamber, the stator assembly comprising a housing having a cavity formed therein and a stator located within the cavity, the stator assembly containing an integral cooling tube located radially inward of the stator; the cooling tube is separated from the stator by a gap, wherein the gap is non-uniform at all points around a circumference of the cooling tube, and wherein the gap has wider-gap areas that are alternated with narrower-gap areas, applying a vacuum to the stator assembly in the vacuum chamber; flowing a potting material into a gap between the stator and the cooling tube, the gap extending a first distance longitudinally between the stator and the cooling tube; and applying a pressure to the potting material to push the potting material further into the gap; and applying the pressure to the potting material to push the potting material further into the gap further comprises inserting the housing into a pressure vessel, and applying air pressure to the potting material to push the potting material further into the gap, wherein increased pressure in the pressure vessel as compared with ambient pressure results in the potting material at the ends of the gap in the stator assembly being pushed further into the center, along the longitudinal distance, of the gap, wherein the potting material completely fills the narrower-gap areas.

2. The method of claim 1, wherein prior to applying the pressure to the potting material to push the potting material further into the gap the potting material is allowed to flow a first selected distance longitudinally into the gap, the first selected distance being less than the first distance.

3. The method of claim 2, further comprising ceasing application of the pressure when the potting material extends the first distance longitudinally between the stator and the cooling tube and curing the potting material.

4. The method of claim 2, wherein prior to placing the stator assembly into the vacuum chamber, the method further comprises mixing the potting material while heating.

5. The method of claim 2, wherein prior to placing the stator assembly into the vacuum chamber, the method further comprises degassing the potting material while heating.

6. The method of claim 1, further comprising curing the potting material after applying the pressure to the potting material.

7. The method of claim 1, wherein prior to placing the stator assembly into the vacuum chamber, the method further comprises installing the pump motor stator into the cavity.

8. The method of claim 1, wherein prior to placing the stator assembly into the vacuum chamber, the method further comprises inserting the stator assembly into the housing set containing the integral cooling tube radially inward of the stator.

9. The method of claim 1, wherein prior to placing the stator assembly into the vacuum chamber, the method further comprises heating the potting material to a selected temperature.

10. The method of claim 1, further comprising heating the vacuum chamber while applying the vacuum to the stator assembly in the vacuum chamber.

11. The method of claim 1, wherein the potting material is an epoxy potting compound.

12. The method of claim 1, further comprising removing the stator assembly from the vacuum chamber to apply the pressure.

13. A potted stator assembly comprising: a housing having a cavity formed therein; a stator located within the cavity; a cooling tube located radially inward of the stator, the cooling tube and the stator being separated by a gap, wherein the gap is non-uniform at all points around a circumference of the cooling tube, and wherein the gap has wider-gap areas that are alternated with narrower-gap areas, a potting material located in the gap, the potting material being configured to electrically insulate the cooling tube from the stator and thermally connect the cooling tube to the stator, wherein the potting material completely fills the narrower-gap areas.

14. The potted stator assembly of claim 13, wherein the potting material is an epoxy potting compound.

15. The potted stator assembly of claim 13, wherein the gap is 0.002 inches at narrowest parts.

* * * * *